Dec. 11, 1923.
M. C. COSGRAY
1,476,800
ELECTRICAL INSTRUMENT CONTACT
Filed July 18, 1921
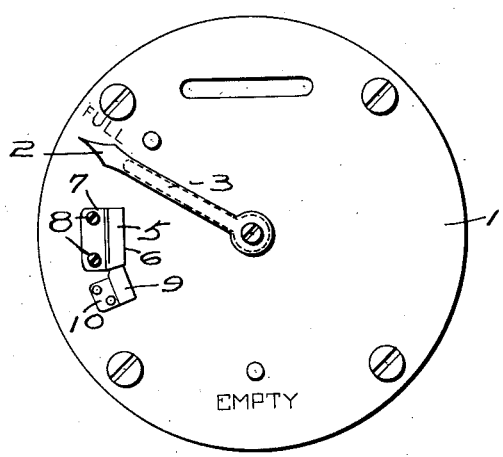
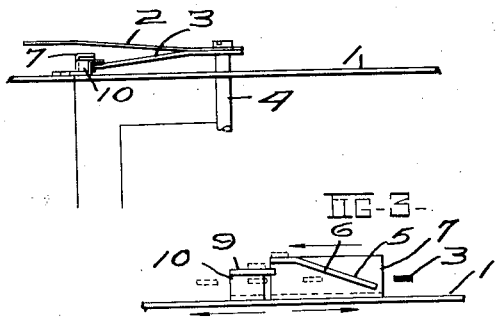
INVENTOR
Mark C. Cosgray.
by
Owen, Owen & Crampton Patented Dec. 11, 1923.

1,476,800

UNITED STATES PATENT OFFICE.

MARK C. COSGRAY, OF SANDUSKY, OHIO.

ELECTRICAL INSTRUMENT CONTACT.

Application filed July 18, 1921. Serial No. 485,576.

*To all whom it may concern:*

Be it known that I, MARK C. COSGRAY, a citizen of the United States, and a resident of Sandusky, in the county of Erie and State of Ohio, have made an invention appertaining to Electrical Instrument Contact; and I do hereby declare the following to be full, clear, and exact description of the invention, such as will enable others skilled in the art to which it appertains to make and use the same, reference being had to the accompanying drawings, and to the characters of reference marked thereon, which form a part of this specification.

My invention has for its object to provide a means for closing and opening a circuit through a delicately constructed and relatively slowly operated element, wherein certainty of electrical contact will be assured when the circuit is closed, and quick opening of the circuit will be performed when it is opened, and thus arcing is prevented. The invention finds its greater advantage when used in connection with electrical measuring instruments having a needle point that is rotated over the face of a dial, wherein one or more circuits are closed and opened, according to the position of the needle on the dial, such as in meters known in the art as Sangamo meters.

The invention may be contained in instruments of different forms and in instruments used for different purposes. To illustrate a practical application of my invention I have selected a mechanism as an example of structures containing my invention, and shall describe it hereinafter. A structure containing my invention, and a part of the instrument to which it is applied, are illustrated in the accompanying drawings.

In the drawings, Figure 1 illustrates the dial or face of a coulomb meter or an ampere hour meter, which is commonly used to indicate the approximate charges contained in storage batteries, the instrument being connected in a circuit of the battery and the source of current supply used for charging the storage battery, and also in the circuit of the main line that may be carried by the battery. Fig. 2 is an edge view of the dial of the instrument and of the parts containing my invention. Fig. 3 is a somewhat diagrammatic view showing the positions of the parts containing my invention relative to the dial or face of the instrument.

1 in the figures indicates the face of the instrument. The instrument is provided with a pointer 2 that is rotated over the face of the instrument by suitable mechanism of the character well known in the art, for causing the pointer to indicate substantially the condition of a storage battery to which the instrument is connected. A flexible contact 3 is also carried by the arbor 4, which causes the rotation of the pointer 2. The contact 3 is made of thin sheet metal and moves over the face of the instrument, and is preferably located below the pointer 2. The outer end of the movable elastic contact 3 is normally positioned a short distance from the face 1 of the instrument. Such instruments are usually provided with round headed contacts that extend a short distance above the face of the instrument and so that the flexible contacts, as they are slowly moved by the arbor of the instruments, ride over the heads of the fixed contacts, and thus establish connections with an electric magnetic switch that controls the circuits of the system in connection with which the instrument is used. By reason of the slow moving flexible contacts, arcing is produced as it approaches and leaves the fixed contacts of the instrument, and also by reason of the very slight friction and slight deflection of the elastic member electrical connection is not always established. This may be due to dirt or to a coating of oxides of the metals of the elastic contacts and the fixed contacts.

By my invention the elastic member is caused to be deflected from its normal position, and so that it will be distorted from its normal position as it approaches the fixed contact, and thus increase the pressure produced by reason of its greatly increased deflection from its normal position or shape. Also the contact is so formed that the movable elastic contact is suddenly released from the fixed contact when the movable contact is moved to either direction from the fixed contact.

As shown in the figures, a body having an inclined surface 5 is so located that the inclined surface is in the path of the end of the elastic member 3. It is also so located that the lower edge will be positioned between the face of the instrument and the end of the flexible contact 3, whereby the end of the elastic contact will be engaged by the inclined surface and raised as it moves in one direction over the dial. The lower edge, however, is located at a position sufficiently remote from the face of the instrument to permit the flexible member to pass beneath the edge when the elastic member is moved in the opposite direction.

The inclined surface 5 may be formed on or supported by any suitable member, having its support outside of the circle described by the end of the elastic member 3. As shown, the inclined surface is located on an inclined flange 6 supported by the angular member 7 that may be attached to the face of the instrument by any suitable means, such as by the screws 8.

The upper end of the flange 6 extends over the end of the fixed contact 9. The fixed contact 9 has a flat surface that contacts with the lower side of the movable elastic contact 3 and so as to form a relatively large contact area between the fixed contact and the movable contact. If desired, one end of the fixed contact may be located beneath the upper end of the flange 6, as shown in Fig. 3. The fixed contact 9 may be in the form of a flange supported at a distance from the face of the instrument much greater than the upper surface of the elastic contact 3 when the elastic contact is in its normal position relative to the face of the instrument, and the contact surface of the fixed contact 9 is located a little more than the thickness of the elastic member 3 towards the face of the dial, than the upper end of the flange 6. This will cause the elastic member 3, located on the fixed contact 9, to be held substantially in its deflected position while resting on the fixed contact 9, and when the flexible contact moves to either end of the fixed contact it will quickly drop to its normal position with reference to the face of the instrument. The movable contact may then continue in its movement, or it may swing back and pass beneath the fixed contact 9 and so as not to make contact with the fixed contact. If it moves clockwise and strikes or touches the underside of the flange 6, it will be carried towards the dial and finally passed beneath the lower edge of the flange 6, and its resiliency will cause it to return to its normal position relative to the face of the instrument.

The fixed contact is supported by a means which is preferably located on the outside of the circle described by the end of the flexible contact 3, such as by the angular portion 10 that is integrally formed with the flange 9. It may be secured by any suitable means to the face of the dial, and an electric circuit may be connected therewith by or through any suitable means.

I claim:

1. In an electric instrument a resilient contact movable over the face of the instrument and normally located in spaced relation with respect to the face of the instrument, means located in the path of the resilient contact for deflecting the contact from its normal position relative to the face of the instrument, a fixed contact for receiving the resilient contact from the said means and located at a distance greater than the normal position of the resilient contact from the face of the instrument.

2. In an electric instrument a resilient contact movable over the face of the instrument and normally located in spaced relation with respect to the face of the instrument, means located in the path of the resilient contact for deflecting the contact from its normal position relative to the face of the instrument, a fixed contact for receiving the resilient contact from the said means and located at a distance from the face of the instrument that is less than the distance of the portion of the deflecting means that causes the greatest deflection from the face of the instrument, and greater than the distance of the normal position of the movable contact from the face of the instrument.

3. In an electric instrument a resilient contact movable over the face of the instrument and normally located in spaced relation with respect to the face of the instrument, a flange located in the path of the resilient contact for deflecting the contact from its normal position relative to the face of the instrument, a fixed contact for receiving the resilient contact from the said flange and located at a distance from the face of the instrument that is less than the distance of the portion of the deflecting flange that causes the greatest deflection from the face of the instrument, and greater than the distance of the normal position of the movable contact from the face of the instrument.

4. In an electric instrument a resilient contact movable over the face of the instrument and normally undeflected and located in spaced relation with respect to the face of the instrument, means located in the path of the resilient contact for deflecting the contact from its normal position relative to the face of the instrument, a fixed contact located in a plane substantially parallel to the face of the instrument for receiving the resilient contact from the said means and located at a distance greater than the normal position of the resilient contact from the face of the instrument.

5. In an electric instrument, a resilient contact movable over the face of the instrument and normally located in spaced relation with respect to the face of the instrument, a flange located in the path of the resilient contact for deflecting the contact from its normal position relative to the face of the instrument, a fixed contact for receiving the resilient contact from the said flange and located between the end of the flange and the face of the instrument and at a point greater than the distance of the normal position of the movable contact from the face of the instrument.

In testimony whereof, I have hereunto signed my name to this specification.

MARK C. COSGRAY.